United States Patent [19]

Osborne

[11] 4,269,030
[45] May 26, 1981

[54] POWER PLANT OPTIMIZATION CONTROL
[75] Inventor: Robert L. Osborne, Wallingford, Pa.
[73] Assignee: Westinghouse Electric Corp., Pittsburgh, Pa.
[21] Appl. No.: 64,458
[22] Filed: Aug. 6, 1979
[51] Int. Cl.³ .............................................. F03G 7/04
[52] U.S. Cl. .................................... 60/641 R; 60/646
[58] Field of Search ................ 60/641, 646, 657, 660; 364/505, 511

[56] References Cited
U.S. PATENT DOCUMENTS

| | | | |
|---|---|---|---|
| 4,062,189 | 12/1977 | Mager | 60/646 |
| 4,087,975 | 5/1978 | Owens | 60/641 |

Primary Examiner—S. Clement Swisher
Attorney, Agent, or Firm—D. Schron

[57] ABSTRACT

Fouling which occurs in the heat exchangers of a thermal energy conversion power plant causes the heat transfer between the circulating fluid and working fluid to be degraded, diminishing the efficiency of the plant. The invention provides for optimizing the net power level of the plant by perturbing the flow of circulating fluid individually to the heat exchangers to identify the direction of flow change which results in an increase in generated net power level and adjusting the flow of circulating fluid to each heat exchanger. This optimization may be carried out periodically. In another case, when temperature differential of the circulating fluid across at least one of the heat exchangers falls below a predetermined level, only the circulating fluid of the related heat exchangers need be altered to optimize the net power level generated by the plant. Heat exchanger fouling may cause the plant to be shut down for cleaning of the heat exchangers during a cleaning time interval succeeding each operational time interval. Another aspect of the invention provides for deriving a ratio of operating time interval to corresponding cleaning time interval which maximizes the net electrical energy produced by the plant.

25 Claims, 6 Drawing Figures

POWER PLANT OPTIMIZATION CONTROL

BACKGROUND OF THE INVENTION

This invention relates broadly to the control of thermal energy conversion power plants, and more particularly to a system for optimizing the net power and energy levels generated thereby based on altering the heat transfer process of the heat exchangers included therein.

Thermal energy conversion power plants, generally of the closed cycle variety similar to that disclosed in U.S. Pat. No. 4,104,883 issued to Fredrick E. Naef on Aug. 8, 1978, include two heat exchangers—an evaporator and a condenser. A working fluid, such as ammonia, for example, is heated to evaporation in the evaporator and then passed through a turbine which is mechanically coupled to an electrical generator. As the working fluid expands through the turbine, it causes the turbine to rotate and drive the generator to produce electrical energy at some electrical power level. Some of the power produced by the turbine-generator system is resupplied to the plant to drive circulating pumps and other auxiliarly equipment which operate the plant cycle. The remaining or net power produced by the plant is generally provided to an external load. In exiting the turbine, the working fluid is cooled in the condenser and thereafter returned, generally under control of a feedpump system to the evaporator where the cycle is repeated.

In Ocean Thermal Energy Conversion (OTEC) type power plants, warm water, usually from the surface of the ocean, is pumped by a circulating pump, for example, through heating tubes of the evaporator and then discharged. Heat from the warm water is transferred through the tube walls of the evaporator to the working fluid for the evaporation thereof. Similarly, cool water, usually taken from depths greater 1000 feet beneath the surface of the ocean and which may have a temperature differential from the surface water on the order of 35°-45° F., is pumped by another circulating pump, for example, through cooling tubes of the condenser and then discharged. Heat from the ammonia exiting the turbine is transferred to the cool circulating water through the tube walls of the condenser causing a condensation of the ammonia flowing through the condenser. Because of the relatively small temperature difference between the surface and subsurface ocean waters, the thermal efficiency of these OTEC plants, in general, is extremely sensitive to changes in the heat transfer operations occurring primarily in the evaporator and condenser.

Degradation of the thermal efficiency of OTEC power plants is primarily caused by a phenomenon known as biofouling which is endemic to OTEC type power plants. Biofouling results from bioactivity in the ocean water promoted by nutrients present therein. In the process of biofouling, marine growth is deposited on the surfaces of the tubes of the heat exchanger through which ocean water flows. In time, the deposited layer of growth builds up and acts to increase the thermal barrier between the ocean water and working fluid of the plant ultimately diminishing the heat transfer coefficient therebetween. Consequently, the net output power produced is reduced commensurate with the accumulation of biofouling activity in the tubes of the heat exchangers.

Generally, in conventional power plants, the pumping velocity of the cooling and heating circulating fluid of a heat exchanger is held substantially fixed by maintaining the power to the circulating pumps at a fixed level. However, when this conventional control approach is applied to OTEC type power plants, a great deal of energy in pumping the ocean water through the tube or shell, as the case may be, of the heat exchangers may be, at times, wasted because of the biofouling phenomenon. What makes this particularly significant is that there exists, mainly due to the relatively small temperature differential in the ocean water, a circulation flow in the OTEC plants of 20-50 times that of an equivalent power producing conventional plant. This requires the supply of a commensurate amount of pumping power therefor. Thus, in an OTEC plant, the power supplied to the circulating pumps becomes a major portion of the gross output power produced thereby. And, accordingly, any improvement in the efficiency of operation of these circulating pumps will ultimately result in a proportional increase in the amount of net power produced by the OTEC plant, thus improving the overall plant efficiency. In view of this understanding, it is apparently desirable to provide a system which can maintain an optimum pumping power level for the circulating pumps during the operation of the OTEC plant based on the adverse influence of the biofouling activity on the net power production thereof.

In another aspect, it is proposed that, at some point in time during the biofouling degradation of the net power output of the OTEC plant, the plant is to be shutdown for the purposes of cleaning the buildup of growth in the tubes of the heat exchangers as a part of the plant's maintenance procedures. Inasmuch as this be the case, it appears economically advantageous to determine the optimum plant operational duty cycle with respect to plant maintenance cleaning time. For example, if the plant is shutdown for cleaning too frequently, the plant operating time is expected to be much less than the cleaning time rendering a relatively low net energy output. Conversely, if the plant is shutdown for cleaning too seldom, it is expected that the net power will diminish substantially over the time the plant is operative due to the biofouling accumulation in the heat exchangers; and, based qualitatively on the anticipated growth buildup over the extended plant operating time, it is also expected that it will take longer for the cleaning process. Therefore, the seldomly cleaned OTEC plant is not expected to yield much more net electrical energy than that which is cleaned too frequently. It follows that a system which monitors the plant's activities for determining the operation and cleaning times of which yield an optimum plant net energy output is additionally desirable.

SUMMARY OF THE INVENTION

The present invention may be embodied in a thermal energy conversion power plant which includes at least one heat exchanger for conducting immiscibly a working fluid and a circulating fluid therethrough for transferring heat therebetween, the heat transfer process having an influence on the net power level being produced by the plant. In accordance with one aspect of the present invention, the net power level of the plant is optimized substantially by perturbing the heat transfer operation of the at least one heat exchanger about a quiescent state, identifying the direction of perturbation which results in an increase in generated net power level with respect to the generated net power level corresponding to the quiescent heat transfer state, and adjusting the heat transfer process in the identified direction from the quiescent heat transfer state until an optimum in generated net power level is substantially reached.

More specifically, the plant may be an ocean thermal energy conversion (OTEC) power plant which preferably uses ocean water as the circulating fluid at first and second temperatures to evaporate and condense ammonia, preferably used as the working fluid, in an evaporator and a condenser, respectively. The heat transfer process occurring in both the evaporator and condenser is altered, in the OTEC plant embodiment, by regulating, preferably using a circulating pump, the flow of the circulating ocean water through each of the heat exchangers. In one case, the ocean water flow of the heat exchangers may be perturbed at predetermined times to identify the flow regulation direction of the ocean water through the heat exchangers which results in optimizing the power level of the plant; wherein thereafter, the flow is adjusted in the identified direction to substantially attain the plant power level optimum. Preferably, in this case, the ocean water flow is altered individually through each of the heat exchangers for the purposes of optimizing the plant power level with respect to the heat transfer process of each heat exchanger. In another case, the ocean water flow of the heat exchangers—the evaporator and the condenser, may be altered for the purposes of optimizing OTEC plant power at times based on the temperature differential of the ocean water across the heat exchangers. More particularly, at times when the circulating fluid temperature differential across one of the heat exchangers falls below a predetermined level, the flow of circulating fluid to the one heat exchanger is altered according to the steps described, supra, for the purposes of optimizing plant power individually with respect to the heat transfer process of the one heat exchanger.

Since the heat transfer process of the heat exchangers of the OTEC plant may be degraded by fouling occurring therein causing the generated net power of the plant to diminish over an operational time interval, the plant is shut down at various time intervals to remove the fouling material accumulated within the heat exchangers. In accordance with another aspect of the invention, the net electrical energy produced by the plant is optimized substantially by measuring each operational time interval and deriving the net electrical energy produced by the plant during such intervals, measuring each cleaning time interval related to removal of the fouling material accumulated in the heat exchangers during corresponding operational time intervals, and deriving the ratio of measured operational time interval to corresponding cleaning time interval which maximizes the derived net electrical energy produced by the plant.

DESCRIPTION OF THE PREFERRED EMBODIMENT

Figure 1:
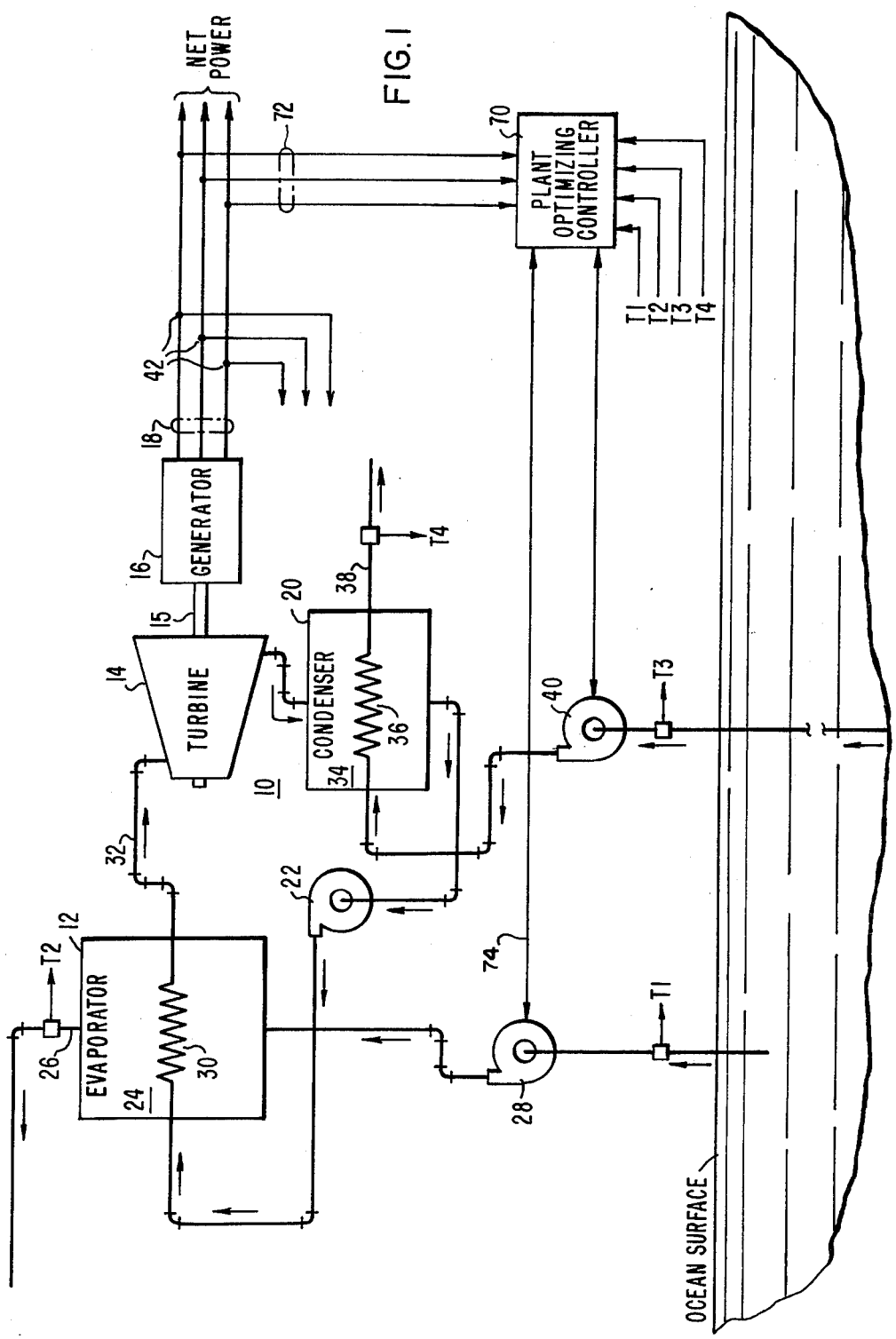
FIG. 1 depicts a thermal energy conversion power plant suitable for embodying the principles of the present invention.

The broad principles of the present invention are described herebelow in connection with a thermal energy conversion power plant, such as that shown in FIG. 1. Referring to FIG. 1, an ocean thermal energy conversion (OTEC) power plant 10 generally comprises a conventional evaporator 12, a turbine 14, a generator 16, electrical transmission lines 18, a condenser 20 and an evaporator feed pump 22. The plant arrangement 10 shown in FIG. 1 is commonly referred to as a closed cycle type ocean thermal energy conversion power plant; however, it is not intended to limit the present invention to such an arrangement.

The conventional boiler 12, which may be of the tube and shell variety, conducts a circulating fluid of a first temperature through a tube section 24 and discharges the circulating fluid at the discharge port 26. In the present embodiment the circulating fluid is taken from the warm ocean surface waters and pumped through the shell portion 24 of the evaporator 12 at a desired flow by a flow regulating device, like a conventional circulating pump shown at 28. The pump 28 may be of the electrically motor driven circulating pump variety generally known to be used in these type power plants. A working fluid, such as ammonia, for example, is conducted through the tube portion 30 of the evaporator 12 where it is evaporated into a vapor by the heat transferred thereto from the circulating fluid through the tube walls and the vapor is discharged through piping 32 and into the turbine 14 where it imparts its energy to rotating mechanically the rotor of turbine 14.

The ammonia vapor exits turbine 14 and is conducted through the condenser 20, which may also be of the tube and shell variety. Circulating fluid at a second temperature which is lower by approximately 35°–45° F. from said first temperature may be flow regulated through the tube portion 36 of the condenser 20 at a desired flow and discharged at port 38 thereof. In the OTEC power plant of FIG. 1, the condenser circulating fluid is ocean water which is generally pumped from depths of greater than 1,000 feet below the ocean surface. For the purposes of the present embodiment, an electrically motor-driven circulating pump 40 may be used to regulate the flow of circulating fluid through the condenser 20. As the ammonia vapor is conducted through the shell portion 34 of the condenser 20 it is condensed into a liquid form due to the heat being transferred therefrom to the circulating fluid through the tube walls.

The condensed working fluid exiting from the condenser 20 is returned to the evaporator normally by an electrically driven feed pump 22, commonly referred to as a condensate or evaporator feed pump. The control of the pump 22 is normally associated with the workings of the closed cycle power plant system 10 and is in no way directly connected with the present invention.

The turbine rotor 15 is mechanically coupled to drive the generator 16 which converts the mechanical power of the turbine into electrical power which is developed over the transmission lines 18. Power may be tapped from points 42 of the transmission lines 18 and resupplied to the power plant 10 for operating the pumps 22, 28, and 40 and other plant auxiliaries which are conventionally associated with an OTEC plant. The remaining power or net power is then distributed to either an isolated load such as a processing plant or desalinization plant, for example, or tied into a utility's network.

Among the things that affect the heat transfer process or which may be used to control the heat transfer process in the heat exchangers 12 and 20 are the flow of the circulating water through the shell side 24, the flow of working fluid through the tube side, and the heat transfer coefficient between the circulating and working fluids within the boiler 12, for example.

It is commonly known that marine growth which is prevalent in ocean waters is carried through into the evaporator 12 and condenser 20 and adheres to the tube surfaces 24 and 36 therein. This process is commonly referred to as biofouling. In time, the biofouling material builds up on the tube surfaces to an extent to create a sufficient thermal barrier between the circulating fluid and working fluid conducted immiscibly through each the boiler 12 and condenser 20. This thermal barrier has an adverse effect on the heat transfer coefficient of the heat transfer process being carried out in each of the heat exchangers 12 and 20. At fixed circulation fluid flows through 12 and 20 as controlled by the pumps 28 and 40, respectively, the efficiency of the heat exchangers drop off commensurately with the amount of biofouling occurring therein. Ultimately, the net power produced by the OTEC power plant is reduced as the efficiency of the heat exchangers 12 and 20 is diminished. This may be exemplarily illustrated by the curves depicted in the graph of FIG. 2 of the instant application.

Figure 2:
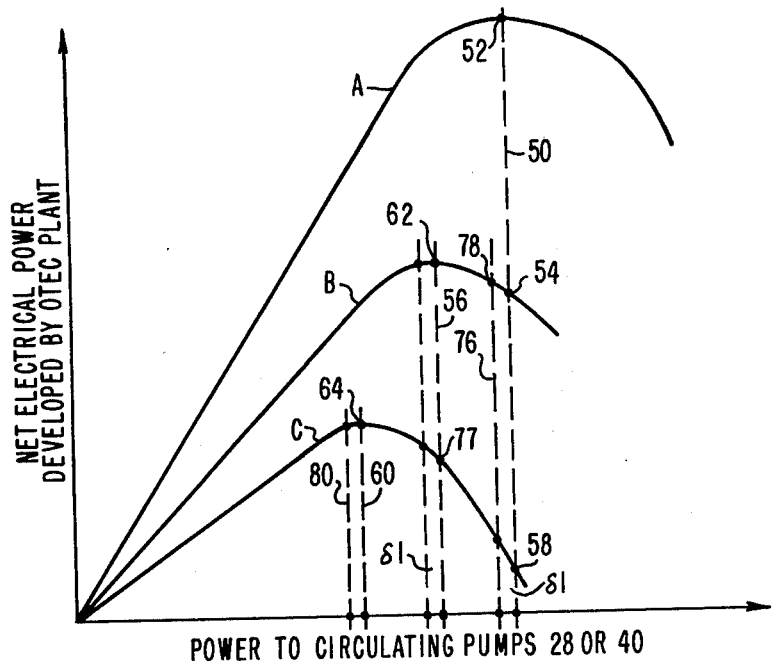
FIG. 2 is a graph illustrating typical relationships between the net electrical power developed by the plant of FIG. 1 and the degree of heat transfer of the heat exchangers of the plant as measured by the power supplied to the circulating pumps associated therewith.

Referring to FIG. 2, the abscissa of the graph relates to the amount of power supplied to the circulating pump 28 or 40. And, the ordinant relates to the net electrical power produced by the OTEC plant 10. Curves A, B and C depict illustratively relationships between the power supplied to the circulating pump 28 or 40 or in essence, the flow of circulating fluid through the corresponding heat exchanger 12 or 20 and the net electrical power developed by the plant 10 under various degrees of biofouling which may occur in the evaporator 12 and condenser 20. For example, curve A may relate to a relationship between the pump power or circulating fluid flow and net electrical power developed with substantially no biofouling occurring. And accordingly, curves B and C may exemplify worsening degrees of biofouling, respectively, in the heat exchangers 12 and 20.

To better understand the graph of FIG. 2, assume that the pump power to the pump 28 or 40 corresponds to the dashed line 50 which intersects curve A at point 52. For purposes of this description, assume that the power to the pump 28 or 40 has been optimized for the condition of no biofouling. Therefore as biofouling occurs to the degree as depicted by the curve of B and the circulating pump power remains fixed along the dashed lines 50, the net electrical power developed by the OTEC plant will correspond to the intersecting point 54 which incidentally is a substantial reduction in net electrical power developed. And, not only that, but under the conditions depicted by curve B it is readily observed that the net electrical power being developed is not at an optimum. In this case, a considerable amount of pump power (i.e. that difference which exists between dashed line 50 and dashed line 56) is being wasted under this biofouling condition because the net power level generated has not been optimized. If the biofouling process continues and degrades to a worsening degree, such as that depicted by curve C and the power to the pumps 28 and 40 remains unchanged at that of the dashed line 50, for example, then the net power developed by the OTEC plant corresponds to the intersecting point 58 on the curve C. Once more, it is readily observed that an appreciable amount of power being supplied to either one or both or a combination of the circulating pumps 28 and 40 is being wasted. Specifically, it is the difference in pump power between that of the dashed lines 60 and 50 which is wasted because the net power generated has not been optimized. In the above discussion, it was assumed that the point 62 where the dashed line 56 intersects curve B is an optimum point of curve B and the point 64 where the dashed line 60 intersects curve C was also an optimum point of the curve C.

It is well known that due to the small temperature difference, approximately 35°–45° F. between the surface and subsurface waters of the ocean, there must exist very large amounts of ocean water flow through the evaporator 12 and condenser 20 to generate an appreciable amount of power. To have a thermal energy conversion power plant which produces an equivalent amount of power as a conventional steam turbine-generator power plant, for example, it takes from between 20–50 times the amount of circulating fluid to flow through the heat exchangers thereof. Since there is a commensurate relationship between the amount of flow through the heat exchangers and the power supplied to the pump which is used to regulate that flow, the amount of power required to electrically drive the pumps 28 and 40 will be on the same order greater than that required for a conventional power plant. In view of the foregoing, it is readily apparent that a higher percentage of the gross power developed by the OTEC power plant 10 will be resupplied thereto for operation of these circulating pumps. Since this is the case, optimizing the efficiency of these pumps at any degree of biofouling will contribute significantly to increasing the amount of net power developed by the plant 10. Therefore, one of the main aspects of the present invention is directed to regulating the circulation fluid flow through the heat exchangers by controlling the power supplied to the circulating fluid pumps to optimize the net electrical power developed by the OTEC power plant under various degrees of biofouling conditions.

In accordance with this aspect of the present invention, a plant optimizing controller 70 may be disposed in the OTEC power plant 10 for the purposes of measuring the net electrical power developed by the OTEC plant utilizing the electrical signal lines 72 and for controlling the regulation of circulation fluid to the heat exchangers 12 and 20 by controlling the power to the circulating pumps 28 and 40, respectively, as a function based on the measured net electrical power developed. At predetermined times during plant operation, the controller 70 may perturb the power being electrically supplied over signal line 74 to pump 28 to alter the circulating fluid flow to the heat exchanger 12 in one direction and then another to determine if one or the other perturbations cause an increase in measured net electrical power as measured over signal lines 72.

Suppose for example, that the plant biofouling conditions are as that shown by curve B in FIG. 2 and that the power supplied to the circulating pump 28 is representative by the dashed line 50 intersecting curve B at point 54. Now, a perturbation δ1 corresponding to the pump power difference between the dashed lines 76 and 50 decreases the power slightly to circulating pump 28, for example, and causes an increase in net electrical power corresponding to the point 78 on curve B. Once it has been identified that a decrease in circulating pump power or circulating fluid flow yields an increase in net electrical power developed by the plant, then the optimizing controller 70 may continue to adjust the circulating pump power in the decreasing direction until it reaches the pump power corresponding to dashed line 56 of FIG. 2. Thereafter, a small incremental decrease in pump power will result in a decrease in net electrical power developed which is indicative that an optimum point is at 62 on curve B corresponding to the circulating pump power of the dashed line 56. A similar procedure may also be either independently or concurrently performed for the circulating pump 40 to bring about an optimum in net electrical power produced by altering the pump power supplied to the pump 40 by the optimizing controller 70.

Should the biofouling continue and degrade the efficiency of the heat exchangers 12 and 20 to that depicted by the curve C in FIG. 2, the net electrical power of the plant 10 may diminish to that corresponding to point 77 where the dashed line 56 intersects with the curve C. Once again the optimizing controller 70 may perturb the power either to both of the pumps 28 and 40 concurrently or to first one and then the other independently to optimize the net power developed for each pump. Typically, under the biofouling conditions of curve C a decreasing perturbation direction from point 77 of curve C yields an increase in net electrical power developed as measured over signal lines 72 by the controller 70. Therefore, the decreasing direction of pump power is identified as increasing the net electrical power developed. The circulating pump power may be then adjusted in the decreasing direction until an optimum is substantially reached at point 64 on curve C, for example, corresponding to the pump power of dashed line 60. It is observed that an additional decrease in the circulating pump power to dashed line 80 would result in a decrease in net electrical power developed by the plant.

It is understood that while the descriptions provided above in connection with the operation of the optimizing controller 70 has been directed to decreasing the pump power to increase the net electrical power developed by the plant, there may be, however, cases in which an increase in the power supplied to the circulating pumps may increase and optimize the net electrical power developed by the plant and it is the intention of the present invention to also include these cases.

Figure 3:
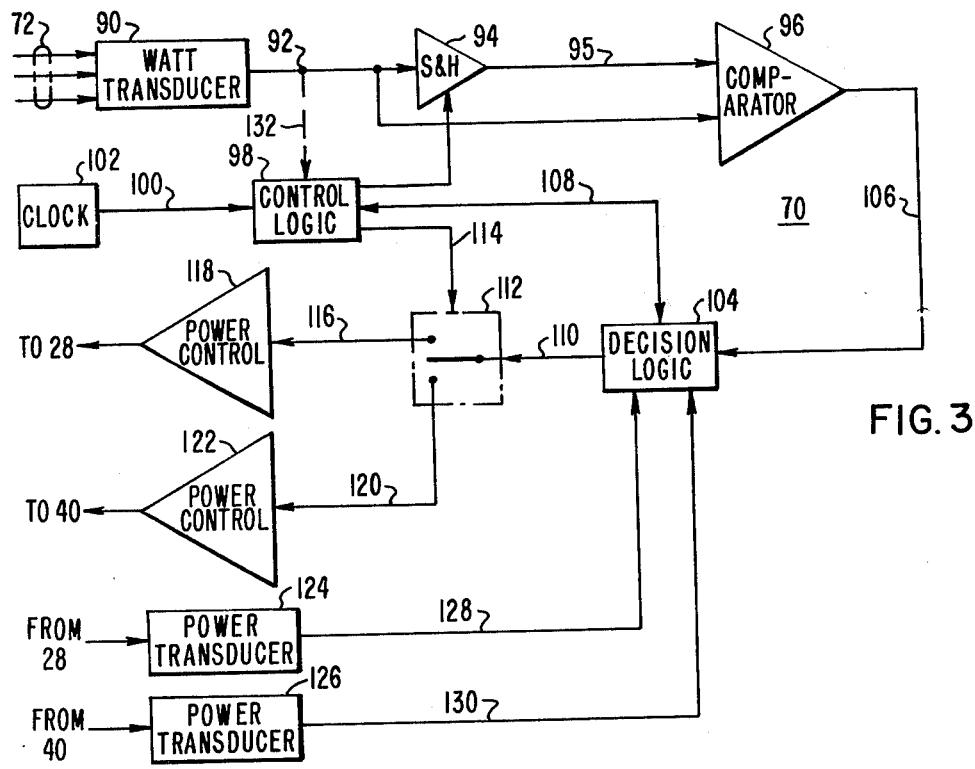
FIG. 3 is a schematic block diagram of a plant optimizing controller suitable for use in the embodiment of FIG. 1.

An exemplary functional block diagram schematic suitable for use in the optimizing controller 70 is shown in FIG. 3. Referring to FIG. 3, the signal lines 72 may be tapped from appropriately chosen points of the transmission line 18 utilizing conventional potential transformers and current transformers in a known measuring configuration, and may be supplied as inputs to a conventional watt transducer 90, for example, which may be used to compute a signal 92 representative of the net power developed by the OTEC plant 10. The signal 92 may be provided to the input of a sample and hold function 94 and to one input of a comparator function 96, and the output of the sample and hold function 94 may be supplied to the other input of the comparator 96. A control logic functional block 98 which may be comprised of known logical elements is used in the present embodiment for sequentially controlling the operations of the controller at various predetermined times as activated by clock signals 100 derived from a digital clock 102. In the more practical case, these predetermined times may be periodic in nature. The control logic block 98 may interact cooperatively with a decision logic block 104 in sequentially controlling the operation of the controller 70. The decision logic block 104 may also be comprised of a number of known logical elements which may be affected by the output of the comparator 96 and the signal lines 108 interacting with the control logic block 98.

A signal 110 representative of an incremental pump power increase command or an incremental pump power decrease command is derived by the decision logic block 104 based on the states of the signals 106 and 108. The signal 110 is coupled to the pole of a single pole double throw (SPDT) functional switch 112 which is operated by the signal 114 generated by the control logic block 98. One position of the switch 112 is coupled over signal line 116 to a power controller 118 for the circulating pump 28 and similarly, the other position of the switch 112 is coupled over signal line 120 to a power controller 122 utilized for controlling the power to circulating pump 40. These controllers 118 and 122 may function in accordance with any one of the known types of power control principles such as phase control, pulse width control or pulse rate control, for example, which are all well known to anyone skilled in the pertinent art area. To further guarantee that the power being used by the pumps 28 and 40 is that which is desired as governed by the signals 116 and 120, conventional power measuring transducers such as that shown at 124 and 126 may be coupled to the pumps 28 and 40 respectively to measure the power being consumed thereby and to generate signals 128 and 130 which are representative respectively of the consumed power which are provided to the decision logic block 104.

Typically, in the operation of the controller 70, one of the clock signals over signal line 100 generated by the digital clock 102 may be used to initially activate the control logic block 98 to require the sample and hold functional circuit 94 to store the instant value of the signal 92 which is representative of the instantaneous net power being developed by the plant. This stored signal 95 may then be compared with the time varying measured net power signal on line 92. The control logic 98 then may set the switch 112 into position to control the power of one or the other of the circulating pumps 28 and 40. For example, suppose the switch 112 is controlled to the position coupling the signal 110 to the signal line 116 coupled to the power controller 118. Thereafter, the control logic block 98 may request, over signal line 108, the decision logic block 104 to perturb the power going to circulating pump 28 by an incremental amount. An example of this is shown in FIG. 2 referring to point 54, for example, on curve B, wherein the power may be perturbed the amount δ1 between the dashed lines 50 and 76. To insure that this has taken place, the decision logic block 104 may monitor the signal line 128 to determine when the power has reached its desired set value.

After a certain predetermined response time, the control logic 98 may request the decision logic block 104 to monitor the output of the comparator 106 to determine if the measured net power, signal 92, has increased beyond that of the quiescent level store in the sample and hold function 94 as a result of the pump power perturbation. If it has increased as a result of the directional change in pump power to 28, for example, then the aforementioned procedural steps may be repeated until an optimum in net power, such as that shown at point 62 in curve B is substantially reached. This of course may be determined by incrementally decreasing the power to pump 28 below the power value corresponding to the dashed line 56 and thereafter, monitoring the output 106 of the comparator 96. In this instance, the net power may drop in value indicating that an optimum has been reached at the pump power corresponding to the dashed line 56. Subsequently, over signal line 108, the control logic 98 may require the decision logic block 104 to return the power of circulating pump 28 the incremental amount δ1 back to that corresponding to the dashed line 56 where an optimum in net power developed is substantially obtained. The control logic block 98 may thereafter govern the switch 112 into the position which couples signal 110 to signal line 120 rendering control of the power controller 122 to the decision logic block 104. Subsequently, the foregoing operational procedural steps may be repeated for controlling the power to the circulating pump 40 utilizing power controller 122 to similarly achieve an optimum in net electrical power developed by the plant 10.

While the above embodiment of FIG. 3 has been described controlling the circulating fluid flow regulation of the circulating pumps 28 and 40 independently and sequentially, it is understood that the switch 112 may be deleted from the functional circuit schematic and the signal line 110 be coupled to both the signal lines 116 and 120. The amended embodiment may now control the regulation of circulating fluid by the circulating pumps 28 and 40 simultaneously to achieve the net power developed by the plant 10. Another feature which may be added to reduce the frequency of perturbation of the power to the circulating pumps 28 and 40 may be to couple the signal 92 to the control logic block 98 as shown by the dashed line 132. In this way, at the predetermined times of activation, the control logic may monitor the signal 132 to determine if a change in the net power has occurred between activations. Of course, if the measured net power has not changed, then an optimum may still exist with no adjustment in circulation fluid flow required, thereby avoiding the necessity of perturbing the power to the circulating pumps 28 and 40.

In an alternate embodiment temperature transducers may be appropriately disposed at the heat exchanger tubes through which the circulating fluid flows to measure the temperature differences across the heat exchangers 12 and 20. For example, a temperature transducer T1 may be installed upstream of the circulating pump 28, for example, as shown in FIG. 1 and in addition, a temperature transducer T2 may be installed, in situ, with the circulating fluid discharge at 26. The electrical signals generated by the temperature transducers T1 and T2 may be electrically coupled to the plant optimizing controller 70. In a similar manner, a temperature transducer T3 may be disposed in situ in the circulating fluid flowing upstream of the circulating pump 40, for example, and in addition, a temperature transducer T4 may be disposed in the discharge line of the circulation fluid at 38. Likewise, the generated electrical signals from the temperature transducers T3 and T4 may also be electrically coupled to the plant optimizing controller 70. The operation of the plant optimizing controller 70 may remain essentially the same, but the activation of the operation thereof is changed somewhat in the alternate embodiment which may best be described in connection with the embodiment shown in FIG. 4.

Figure 4:
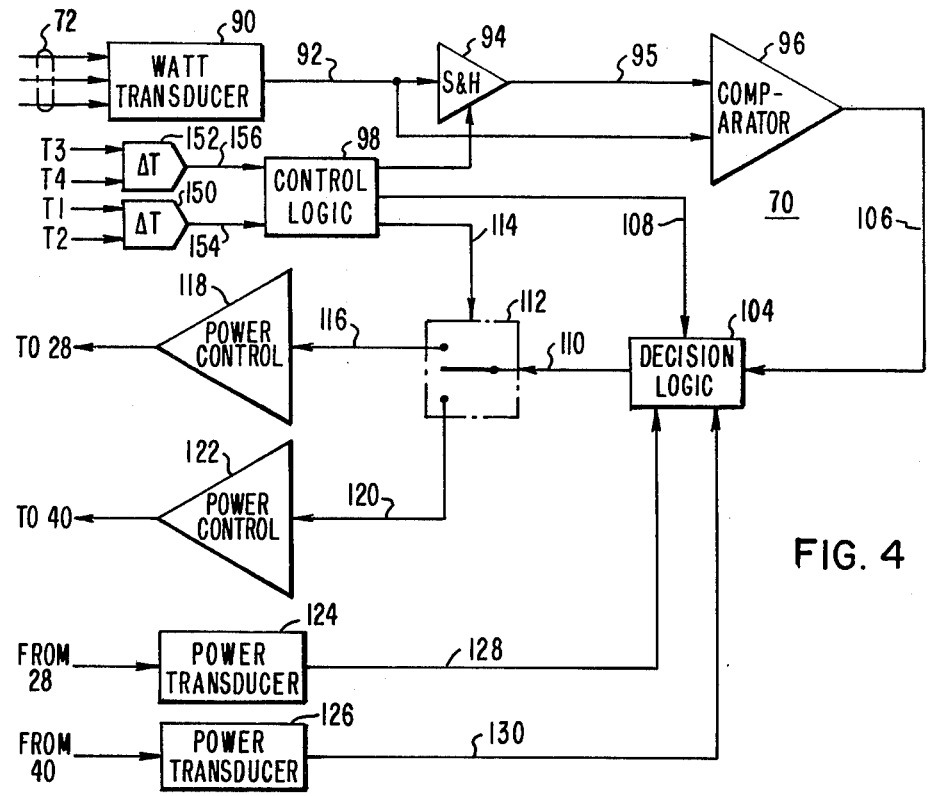
FIG. 4 is an alternative schematic block diagram of a plant optimizing controller suitable for use in the embodiment of FIG. 1.

Referring to FIG. 4, the embodiment of the controller 70 remains essentially unchanged with respect to that shown in FIG. 3 except that the activating clock 102 which provides clock signal 100 is replaced with two differential temperature monitoring devices 150 and 152. Each differential temperature monitoring device may be comprised of a differential amplifier and a comparator with a predetermined differential temperature reference level, for example (not shown). The electrical signals representative of the temperatures T1 and T2 may be input to the differential temperature monitoring device 150 and therein, a differential temperature signal may be derived and compared with a first predetermined reference level. Should the differential temperature signal decrease below the first predetermined reference level an activation signal 154 may trigger the control logic 198 to begin its sequential operation with respect to controlling the power of the circulating pump 28. That is, the switch 112 may be switched to the position which couples signal line 110 to 116 and the operations described hereabove related to optimizing the net power developed by the plant 10 by altering the power supplied to the pump 28 or in essence, the circulation fluid flow through the heat exchanger 12 may be performed.

Similarly, the temperature monitoring device 152 may also be comprised of a differential amplifier and comparator with a second predetermined reference level, for example (not shown). In operation then, the electrical signals T3 and T4 may be substracted in the differential amplifier to produce a signal representative of their difference which may be compared to the second reference level in the comparator. Should the differential temperature of T3 and T4 be less than the second predetermined reference level, an activation signal may appear over signal line 156 to initiate the operation of the controller 70. The switch 112 may then be positioned to couple signal 110 to signal 120, an arrangement which permits the controller to optimize the net power output by controlling the regulation of circulation fluid through the circulating pump 40.

The primary advantage of this alternate embodiment is to perturb the power supplied to the pumps 28 and 40 only at times when needed such as when the temperature difference across the heat exchangers diminish to below a predetermined level. The temperatures across the heat exchangers 12 and 20 will diminish as the biofouling within the heat exchangers worsens. The reason for this is that the biofouling material accumulates on the surface of the tubes of the heat exchangers, for example, increasing the temperature barrier between the ocean water and ammonia or in general, the working fluid and circulating fluid, thus decreasing the heat transfer coefficient therebetween. With less amount of heat being absorbed by the working fluid in the evaporator, the temperature measured by T2 at the discharge will increase thereby effectively decreasing the temperature difference across the evaporator 12, or that between T1 and T2.

Similarly, in the condenser 20 the decrease in heat transfer between the working fluid and circulating fluid will cause the temperature measured by T4 at the discharge 38 to decrease, thus decreasing the temperature difference across the condenser 20 or that between T3 and T4. Thus, these temperature difference measurements provide an adequate indication of the degree of biofouling in the heat exchangers 12 and 20. Therefore, the optimizing controller 70 need only be activated at times when the biofouling accumulates beyond a predetermined limit as determined by the difference in temperature measurements decreasing below their corresponding predetermined reference levels.

Heretofore, the optimizing controller 70 has been described in connection with the operation of optimizing the net power developed by the plant 10 at the various biofouling conditions as exemplarily dipicted in FIG. 2. However, it is understood that the overall net power will be continually decreasing as the biofouling accumulates. It is readily realized that at some point in time in the operation of the plant, the plant must be shut down to remove the biofouling material from the surface of the tubes of the heat exchangers 12 and 20. It is another feature of the present invention to determine the optimum net energy output of the plant considering that the plant may be shut down or made unavailable to produce power during certain cleaning intervals.

Figure 5:
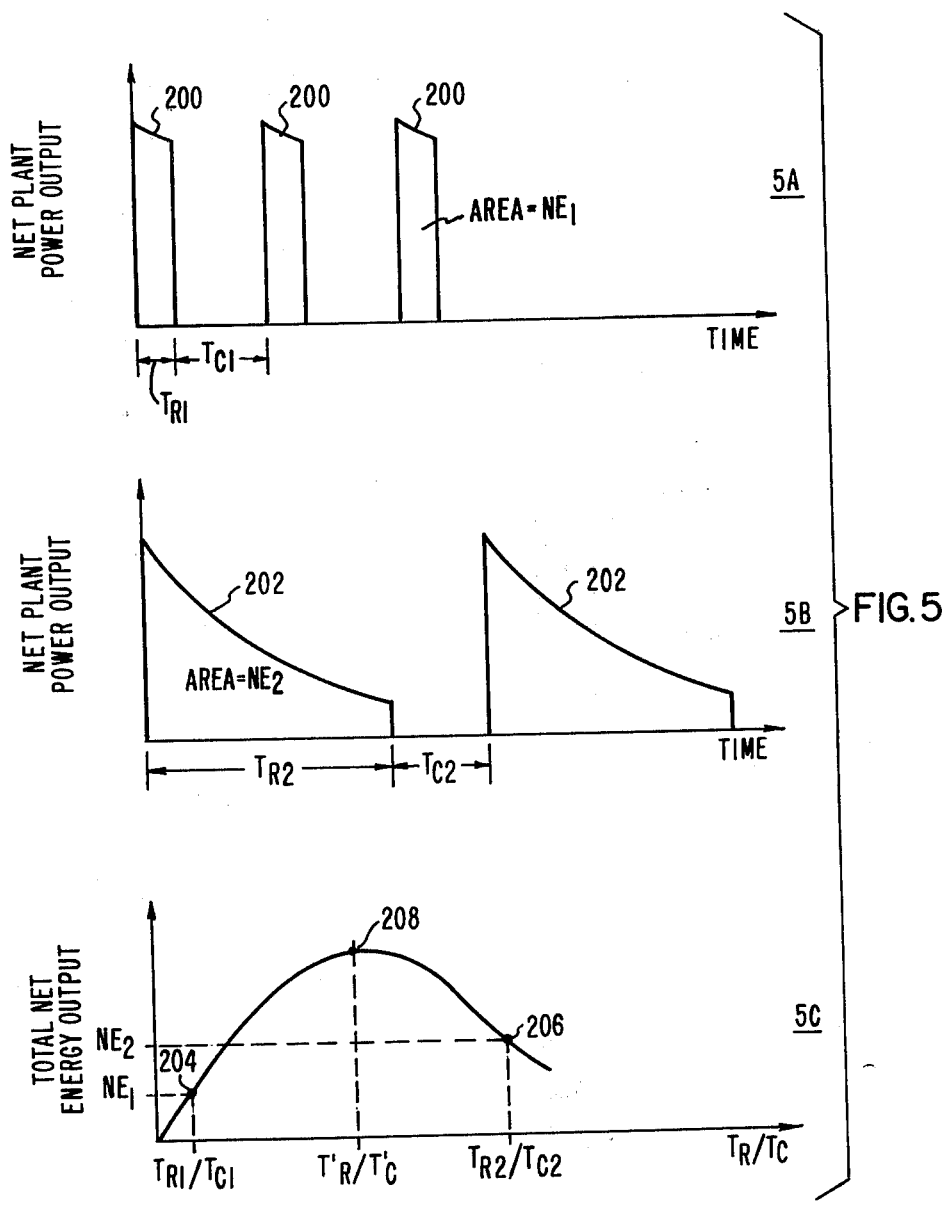
FIG. 5 is a set of graphs exemplifying the electrical energy produced during various operational time intervals of the plant in relationship to corresponding cleaning time intervals.

The curves graphically depicted in FIG. 5 illustrate the various net energy levels relative to the operating and cleaning times of the plant. An example of cleaning the plant too often is depicted in the graph of FIG. 5A. The operating time of the plant is denoted as $T_{R1}$ and the cleaning time of the plant is denoted as $T_{C1}$. The abscissa is in time and the ordinant is a measure of the net plant power output. As illustrated in the graph of 5A, the plant power output on lines 200 is degraded over the operating time of the plant primarily as a result of the worsening biofouling conditions incurred during the operation of the plant. The net energy of the plant may be derived by taking the area under the lines 200 which is denoted as $NE_1$. Cleaning the plant too seldom is shown in the exemplary curve depicted in FIG. 5B. In this case the running time $T_{R2}$ appears greater than the cleaning time $T_{C2}$, however, the power developed by the plant is substantially degraded over the operating time producing a net energy value $NE_2$ which may not be significantly greater than that ($NE_1$) of cleaning the plant too often.

The graph of 5C exemplifies a correlation of this data by plotting on the abscissa the ratio of the running time $T_R$ to the cleaning time $T_C$ and on the ordinant the net energy (NE) generated by the plant corresponding thereto. The points 204 and 206 on the graph correspond to that which may be derived from the examples provided in the graphs 5A and 5B, respectively. As illustrated in the graph of FIG. 5C, there may be an optimum in the total net energy curve at point 208 corresponding to a ratio $T'_R$ and $T'_C$. It is the intention of this feature of the present invention to determine the optimum ratio in running time to cleaning time such as to maximize the net energy developed by the plant with respect to the cleaning thereof.

Figure 6:
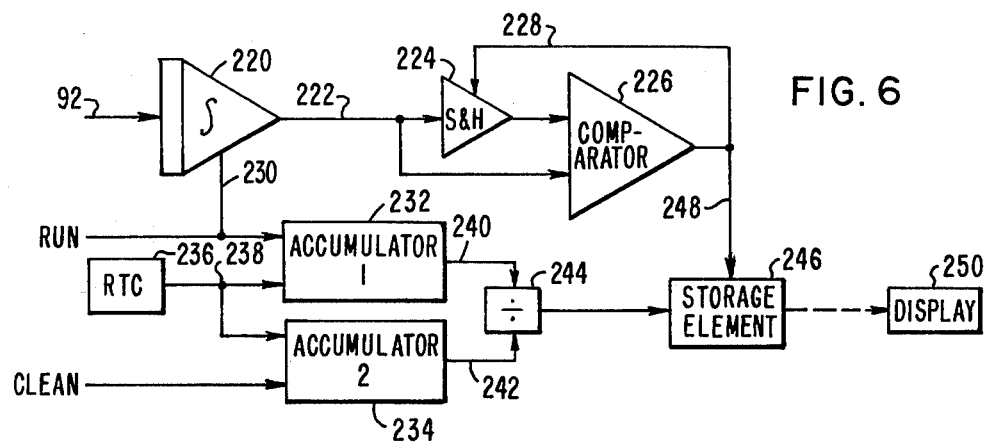
FIG. 6 is a schematic block diagram of an exemplary system for maximizing the net electrical energy generated by the plant of FIG. 1.

An example of an embodiment suitable for these purposes is shown in FIG. 6. Referring to FIG. 6, the signal 92 representative of the net power developed by the plant 10 generated by the watt transducer 90 may be supplied to an integrator function 220. The output of the integrator, signal 222, may be supplied to an input of a sample and hold function 224 and to one input of a comparator function 226. The second input to the comparator function 226 may be the output of the sample and hold function 224. The output of the comparator may be fed back to the storage control input of the sample and hold over signal line 228. A signal RUN and a signal CLEAN are supplied to this embodiment to provide an indication when the plant is being run and conversely, when the plant is shut down and being cleaned. The RUN signal may be coupled to the integrator 220 over signal line 230 and coupled as a control input to an accumulator 232. The CLEAN signal may be coupled to a control input of another accumulator 234. Further disposed in the embodiment of FIG. 6 is a conventionally configured real time clock circuit 236, the output 238 of which may be accumulated in both the accumulators 232 and 234 at prespecified times. The output signal 240 of accumulator 232 is divided by the output signal 242 of accumulator 234 in a conventional divider circuit 244. The output of the divider circuit 244 is supplied as a data input to a conventional storage element 246. A trigger signal 248 is supplied to the storage element 246 from the output of the comparator 226. The output of the storage element 246 may be coupled to a conventional display device 250 which may be disposed either locally or remotely therefrom.

Typically, the embodiment described in connection with FIG. 6 operates by integrating the net power signal 92 in the integrator 220 during the time the plant is running, therefore providing a net energy signal over line 222 corresponding to the running times of the plant. In addition, the real time clock signal 238 is accumulated in the accumulator 232 for the running time of the plant to provide a measure of time associated therewith. Likewise, during the cleaning time of the plant, the integrator 220 is inhibited and real time clock signal 238 is accumulated in the accumulator 234 to provide a measure of time corresponding to the time of cleaning the heat exchangers of the plant, primarily. The divider circuit 244 provides the ratio of the running time to the cleaning time for each cycle. Initially the sample and hold function 224 may be set to a reference level normally 0. Consequently, for the first cycle of running time to cleaning time the net energy generated will most likely be greater than 0. Thus, the comparator will output a positive signal causing the net energy generated by the present cycle represented by signal 222 to be stored in the sample and hold function 224 for comparison with a subsequent net energy valve generated in a subsequent cycle. In addition, the comparator output may trigger the storage of selected time ratios into the storage element 246 for display at 250. As subsequent running time to cleaning time cycles occur, the corresponding net energy levels may be compared to the largest previous one which has been generated and stored in the sample and hold function 224. Each time a net energy level generated is greater than any previously generated, the comparator may reflect such by storing the present net energy level in the sample and hold function 224 and likewise, storing the time interval ratio corresponding thereto in the storage element 246, thereby repetitiously identifying the time interval ratio associated with the maximum net energy generation. It is felt that in time an optimum similar to the point 208 shown in FIG. 5 may be achieved by this embodiment.

It is understood that the embodiments shown in connection with FIGS. 3 through 5 are merely representative of that which may be used to embody the principles of the present invention. Accordingly, it is further understood that the present invention should not be limited to any one embodiment, but rather be construed in the breadth and broad scope of the claims accompanying this application.

I claim:

1. In a thermal energy conversion power plant, which generates electrical energy at a desired power level, including a working fluid; a circulating fluid; and at least one heat exchanger which conducts immiscibly the circulating and working fluids therethrough for transferring heat therebetween, said heat transfer process having an influence on the net power level being generated by said plant, the improvement being a method of optimizing the net power level generated by said plant comprising the steps of:

perturbing the heat transfer process of said at least one heat exchanger about a substantially quiescent heat transfer state;

identifying a direction of perturbation which results in an increase in generated net power level with respect to the generated net power level corresponding to said substantially quiescent heat transfer state; and adjusting the heat transfer process in said identified direction from said substantially quiescent heat transfer state until an optimum level in generated net power is substantially reached.

2. The method in accordance with claim 1 including the step of repeating the optimizing steps of claim 1 at selected intervals in time.

3. The method in accordance with claim 2 wherein the optimizing steps are repeated periodically.

4. The method in accordance with claim 1 including the steps of:

measuring the temperature difference of the circulating fluid across the at least one heat exchanger; and repeating the optimizing steps of claim 1, at times, when the measured temperature difference of the circulating fluid falls below a predetermined level.

5. The method in accordance with claim 1 wherein the step of pertubing the heat transfer process comprises incrementally altering the flow of circulating fluid through the at least one heat exchanger about a substantially quiescent flow state.

6. The method in accordance with claim 5 wherein the step of identifying a perturbation direction comprises identifying the incremental direction of the change in the flow of the circulating fluid which results in an increase in generated net power level with respect to the quiescent power level.

7. The method in accordance with claim 6 wherein the step of adjusting the heat transfer process comprises adjusting the flow of the circulating fluid in the identified direction until an optimum level in generated net power is substantially reached.

8. The method in accordance with claim 7 wherein the step of adjusting the flow of circulating fluid further includes:

(a) adjusting the flow of circulating fluid a predetermined increment in the identified direction;

(b) measuring the change in the generated net power level as a result of said incremental adjustment;

(c) repeating steps (a) and (b) if said measured change is an increase;

(d) otherwise, readjusting the flow of circulating fluid said predetermined increment in the opposite direction to that identified, whereby the resulting flow in circulating fluid renders an optimum in generated net power level.

9. In a thermal energy conversion power plant, which generates electrical energy at a desired power level, including a working fluid, a circulating fluid, and at least one heat exchanger which conducts immiscibly the circulating and working fluids therethrough for transferring heat therebetween, said heat transfer process having an influence on the net power level being generated by said plant, the improvement being the method of optimizing the net power level generated by said plant comprising the steps of:

perturbing the flow of the circulating fluid in one direction from a substantially quiescent flow state through said at least one heat exchanger;

measuring a first change in the generated net power level from a quiescent net power level, corresponding to said substantially quiescent flow state, resulting from the perturbed flow of circulating fluid in said one direction;

adjusting the flow of circulating fluid in said one direction until an optimum in the generated net power level is identified, if said measured first change is an increase;

perturbing the flow of the circulating fluid in a direction opposite said one direction from said substantially quiescent flow state through said at least one heat exchanger, if said measured first change is a decrease;

measuring a second change in the generated net power level from said quiescent net power level resulting from the perturbed flow of the circulating fluid in said opposite direction;

adjusting the flow of circulating fluid in said opposite direction until an optimum in the generated net power level is identified, if said measured second change is an increase;

returning the flow of the circulating fluid to said substantially quiescent flow state through the at least one heat exchanger, if said measured second change is a decrease, whereby said substantially quiescent flow state yields an optimum in generated net power level.

10. The method in accordance with claim 9 wherein the optimizing steps of claim 9 are repeated at predetermined time intervals.

11. The method in accordance with claim 9 wherein the optimizing steps of claim 9 are repeated periodically.

12. The method in accordance with claim 9 including the steps of:

measuring the temperature difference of the circulating fluid across the at least one heat exchanger;

repeating the optimizing steps of claim 9, at times, when the measured temperature difference of the circulating fluid falls below a predetermined level.

13. In the thermal energy conversion plant in accordance with claim 9, the heat exchangers include an evaporator and a condenser; and wherein the method further includes the steps of:

measuring the temperature difference of the circulating fluid across the evaporator;

measuring the temperature difference of the circulating fluid across the condenser;

repeating the optimizing steps of claim 9 for adjusting the flow of the circulating fluid through the evaporator at times when the measured temperature difference of the circulating fluid across the evaporator decreases below a first predetermined temperature difference; and repeating the optimizing steps of claim 9 for adjusting the flow of the circulating fluid through the condenser at times when the measured temperature difference of the circulating fluid across the evaporator decreases below a second predetermined temperature difference.

14. In the thermal energy conversion plant in accordance with claim 9, the heat exchangers include an evaporator and a condenser; and wherein the method further includes the step of repeating the optimizing steps of claim 9 for the evaporator and condenser independently at predetermined time intervals.

15. The method in accordance with claim 14 where the steps are repeated periodically.

16. In a thermal energy conversion power plant which generates electrical energy at a desired power level including a working fluid, a circulating fluid, and at least one heat exchanger which conducts immiscibly the circulating and working fluids therethrough for transferring heat therebetween, said heat transfer process having an influence on the net power level developed by said plant, the improvement being a system for optimizing the net power level developed by said plant comprising:

means for regulating the flow of circulating fluid through the at least one heat exchanger;

means for measuring the net electrical power developed by said plant; and means for controlling said regulating means to adjust the flow of circulating fluid according to a function based on said measured net electrical power.

17. The system in accordance with claim 16 wherein at predetermined times, the controlling means initially controls the regulating means to perturb the flow of circulating fluid through the at least one heat exchanger to determine the directional change in flow which renders an increase in the measured net electrical power developed by the plant and thereafter, controls the regulating means to adjust the flow of circulating fluid in said determined direction until an optimum in measured net electrical power is substantially reached.

18. The system in accordance with claim 17 wherein the predetermined times are periodic.

19. The system in accordance with claim 17 further including a means for measuring the temperature difference of the circulating fluid across the at least one heat exchanger; and wherein the predetermined times are related to the measured temperature difference decreasing below a predetermined level.

20. The system in accordance with claim 16 wherein the regulating means comprises an electrically driven circulating pump, and the power measuring means comprises a watt transducer; and wherein both said pump and transducer are electrically coupled to the controlling means.

21. The system in accordance with claim 16 wherein the plant is an ocean thermal energy conversion (OTEC) power plant, the working fluid comprises ammonia, and the circulation fluid comprises ocean water; wherein the at least one heat exchanger includes an evaporator for evaporating said ammonia with ocean water at a first temperature, and a condenser for condensing the vaporized ammonia with ocean water at a second temperature which is lower than said first temperature; and wherein the optimizing system includes a first means for regulating the flow of ocean water at said first temperature through the evaporator and a second means for regulating the flow of ocean water at said second temperature through the condenser.

22. The system in accordance with claim 21 including a means for generating a first signal representative of the temperature difference of the ocean water across the evaporator and a second signal representative of the temperature difference of the ocean water across the condenser, said first and second signals being electrically coupled to the controlling means; wherein when said first signal decreases below a predetermined level, the controlling means initially controls the first regulating means to perturb the flow of ocean water through the evaporator to determine the directional change in flow which renders an increase in the measured net electrical power developed by the plant, and thereafter, controls the first regulating means to adjust the flow of ocean water in said determined direction until an optimum in measured net electrical power is substantially reached; and wherein when said second signal decreases below a predetermined level, the controlling means initially controls the second regulating means to perturb the flow of ocean water through the condenser to determine the directional change in flow which renders an increase in the measured net electrical power developed by the plant, and thereafter, controls the second regulating means to adjust the flow of ocean water in said determined direction until an optimum in measured net electrical power is substantially reached.

23. The system in accordance with claim 21 wherein at predetermined times, the controlling means initially controls the first regulating means to perturb the flow of ocean water through the evaporator to determine the directional change in flow which renders an increase in the measured net electrical power developed by the plant and thereafter, controls the first regulating means to adjust the flow of ocean water in said determined direction until an optimum in measured net electrical power is substantially reached; and wherein at predetermined times, the controlling means initially controls the second regulating means to perturb the flow of ocean water through the condenser to determine the directional change in flow which renders an increase in the measured net electrical power developed by the plant and thereafter, controls the second regulating means to adjust the flow of ocean water in said determined direction until an optimum in measured net electrical power is substantially reached.

24. The system in accordance with claim 23 wherein the predetermined times are periodic.

25. The system in accordance with claim 21 wherein the first and second regulating means comprise electrically driven circulation pumps, and the power measuring means comprises a watt transducer, said pumps and said transducer being electrically coupled to the controlling means.

* * * * *